United States Patent [19]
Lu

[11] Patent Number: 4,464,438
[45] Date of Patent: Aug. 7, 1984

[54] BLENDS OF POLYVINYL ALCOHOL AND ETHYLENE-VINYL ALCOHOL COPOLYMER AS GREASE RESISTANT MELT EXTRUDABLE FILMS

[75] Inventor: Pang-Chia Lu, Belle Mead, N.J.

[73] Assignee: Mobil Oil Corporation, New York, N.Y.

[21] Appl. No.: 490,915

[22] Filed: May 2, 1983

[51] Int. Cl.³ .............................................. B32B 27/08
[52] U.S. Cl. ..................... 428/516; 428/35; 428/515; 525/57; 525/58
[58] Field of Search .................... 525/57, 58; 428/516, 428/515, 35

[56] References Cited

U.S. PATENT DOCUMENTS

| 3,997,489 | 12/1976 | Cokes | 525/57 |
| 4,228,250 | 10/1980 | Pritchett | 525/57 |
| 4,254,169 | 3/1981 | Schroeder | 428/35 |
| 4,261,482 | 4/1981 | Yamada et al. | 428/35 |
| 4,281,045 | 7/1981 | Sumi | 428/516 |
| 4,365,041 | 12/1982 | Okamoto et al. | 525/58 |

Primary Examiner—Marion McCamish
Assistant Examiner—E. Rollins Buffalow
Attorney, Agent, or Firm—Alexander J. McKillop; Michael G. Gilman; Edward J. Trojnar

[57] ABSTRACT

Blends of polyvinyl alcohol, and ethylene-vinyl alcohol copolymer containing a processing aid such as polyamide, polyurethane or polyoxazoline are melt extrudable into paper-like films having excellent oxygen barrier and grease resistance properties.

12 Claims, No Drawings

BLENDS OF POLYVINYL ALCOHOL AND ETHYLENE-VINYL ALCOHOL COPOLYMER AS GREASE RESISTANT MELT EXTRUDABLE FILMS

BACKGROUND OF THE INVENTION

Polyvinyl alcohol films are recognized as having excellent grease resistant characteristics as well as superior oxygen barrier properties. However, it is difficult to melt extrude polyvinyl alcohol films in an efficient manner because of the high processing temperatures required. In accordance with this invention, polyvinyl alcohol is blended with ethylene-vinyl alcohol copolymer and a processing aid to produce compositions which are melt extrudable and which possess many of the desirable properties of polyvinyl alcohol films especially with respect to grease resistance.

SUMMARY OF THE INVENTION

The compositions of this invention which are melt extrudable at reasonable processing temperatures comprise three essential components, polyvinyl alcohol, ethylene-vinyl alcohol copolymer, and a polymeric agent which serves as a processing aid. Suitable processing aids include polyamides, polyurethanes and polyoxazolines. The melt blended compositions are melt extruded as single films or coextruded with other polymers. They may also be biaxially oriented to give opaque, paperlike films which exhibit excellent grease resistance.

DETAILED DESCRIPTION OF THE INVENTION

Generally, the compositions in accordance with this invention comprise:
20 to 60 weight percent of polyvinyl alcohol;
30 to 70 weight percent of an ethylene-vinyl alcohol copolymer; and
5 to 20 weight percent of an agent to aid melt processing o f the mixture.

Preferably, the polyvinyl alcohol comprises 30 to 50 weight percent, the ethylene-vinyl alcohol copolymer comprises 40 to 60 weight percent and the processing aid comprises 10 to 15 weight percent of the composition. Blending is accomplished in any manner recognized in the art at elevated temperatures, e.g. about 200° C. For example, a Brabender mixing head is suitable for preparing the blends. The blends can thereafter be melt extruded in the known manner into films which can be biaxially oriented, also in the known manner.

Polyvinyl alcohols suitable for use in this invention are commercially available. Typically polyvinyl alcohol is manufactured from polyvinyl acetate which is substantially completely hydrolyzed to the polyvinyl alcohol. However, some grades of polyvinyl alcohol contain up to about 12 percent vinyl acetate units. As used herein the term polyvinyl alcohol includes those partially hydrolyzed products containing vinyl acetate.

Ethylene vinyl alcohol copolymers suitable for use according to the present invention have no more than about 70 mole % of ethylene, the remainder being essentially vinyl alcohol. A preferred ethylene vinyl alcohol copolymer has from about 28 to about 36 mole % of ethylene.

Kuraray of Japan produces an ethylene-vinyl alcohol copolymer under the designation "EP-F" which has 32 to 36 mole percent ethylene, a molecular weight of 29,500 and a melting point of 183° C. A similar ethylene-vinyl alcohol copolymer designated "EP-E" contains 40–45 mole percent ethylene, has a molecular weight of 29,500 and a melting point of 165° C.

Other manufacturers also produce suitable ethylene-vinyl alcohol copolymers. One suitable copolymer has about 29 mole % ethylene, a molecular weight of 22,000, and a melting point of 185° C.

In addition to the polyvinyl alcohol and the ethylene-vinyl alcohol copolymer, it is advantageous to add a third agent to the blends of this invention in order to assist in melt processing of the mixture. A variety of materials can be used. Polyamides, polyurethanes and polyoxazoline polymers have been found to be particularly advantageous. These and all known materials. For example, suitable polyamides include Nylon 6/66/12 terpolymer. Suitable material of this type is available from Rilsan Corporation as Platamid H205. A suitable polyurethane is Estan 58271 available from B. F. Goodrich. A class of poly(2-substituted-2-oxazoline) polymers is available from Dow. Poly(2-ethyl-2-oxazoline) designated PEOX 425 (Dow) is used in the following examples and has been found particularly useful.

Although the invention has described with reference to three essential ingredients, it will be understood that various additives such as fillers, pigments, stabilizers and the like may be incorporated without departing from the spirit and scope of the invention. Similarly, it is within the scope of this invention to utilize the compositions described herein as a layer or layers in combination with other polymeric layers in multiply films. For example, compositions of this invention can be coextruded with one or more layers of polyolefins such as polypropylene. The films of this invention are suitable for use in packaging foods, particularly greasy or fatty foods.

The invention is further illustrated by the following non-limiting examples.

EXAMPLES 1–5

A series of polymer blends was prepared by mixing polyvinyl alcohol, ethylene-vinyl alcohol copolymer and an agent for assisting processing, as summarized in the Table below. Mixing was done with a Brabender Mixing Head at about 200° C. for about 5 minutes. The blends were pressed into a thin sheet of 5–15 mils and biaxially oriented (3×3) to final film thicknesses of 0.5 to 1.5 mils. The films were opaque and paper like.

The films were tested for oil penetration and compared to a non-woven polypropylene paper (from Webril). In the test the sample film to be tested was laid flat on a piece of filter paper. To the film surface was put 5 drops of vegetable oil. The test film was removed after five minutes. Then the filter paper under it was examined for any oil staining. The films in accordance with this invention exhibited no penetration. The polypropylene paper was soaked through.

| EXAMPLE | (Weight percent) | | | | |
|---|---|---|---|---|---|
|  | 1 | 2 | 3 | 4 | 5 |
| VINOL 523 (Polyvinyl Alcohol) | 45 | 45 | 30 | 30 | 45 |
| EPE (Ethylene-Vinyl Alcohol Copolymer) | 45 | 45 | 55 | — | 45 |
| EPF (Ethylene-Vinyl Alcohol Copolymer) | — | — | — | 55 | — |
| PEOX 425 (Polyoxazoline) | 10 | — | 15 | 15 | — |
| Platamide H-205 (Polyamide) | — | 10 | — | — | — |
| Estane 58271 (Polyurethane) | — | — | — | — | 10 |

What is claimed is:

1. A composition suitable for melt extrusion into opaque films comprising an intimate blend of:
   (A) 20–60 weight percent of polyvinyl alcohol;
   (B) 30–70 weight percent of an ethylene-vinyl alcohol copolymer containing 28 to 70 mole percent of ethylene; and
   (C) 5–20 weight percent of an agent to aid melt processing of the mixture selected from the group consisting of polyamides, polyurethanes and polyoxazoline polymers.

2. The composition of claim 1 in which said agent to aid melt processing is a polyamide.

3. The composition of claim 1 in which said agent to aid melt processing is a polyurethane.

4. The composition of claim 1 in which said agent to aid melt processing is a polyoxazoline polymer.

5. An opaque, melt extruded film comprising:
   (A) 20–60 weight percent of polyvinyl alcohol;
   (B) 30–70 weight percent of an ethylene-vinyl alcohol copolymer containing 28 to 70 mole percent of ethylene; and
   (C) 5–20 weight percent of an agent to aid melt processing of the mixture, selected from the group consisting of polyamides, polyurethanes, and polyoxazoline polymers.

6. The film of claim 5 in which said agent to aid melt processing is a polyamide.

7. The film of claim 5 in which said agent to aid melt processing is a polyurethane.

8. The film of claim 5 in which said agent to aid melt processing is a polyoxazoline polymer.

9. The film of claim 5 which is biaxially oriented.

10. A multi-layer composite film comprising a film layer in accordance with claim 5 and at least one other polymeric film layer.

11. The composite film of claim 10 in which said other polymeric film layer is polyolefin.

12. The composite film of claim 11 in which said other polymeric film layer is polypropylene.

* * * * *